(12) United States Patent
Nuthi

(10) Patent No.: US 9,003,514 B1
(45) Date of Patent: Apr. 7, 2015

(54) SYSTEM AND METHOD TO TROUBLESHOOT A DEFECT IN OPERATION OF A MACHINE

(71) Applicant: General Electric Company, Schenectady, NY (US)

(72) Inventor: Sridhar Nuthi, Sussex, WI (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 14/013,667

(22) Filed: Aug. 29, 2013

(51) Int. Cl.
*G06F 17/00* (2006.01)
*G06F 21/31* (2013.01)

(52) U.S. Cl.
CPC ...................................... *G06F 21/31* (2013.01)

(58) Field of Classification Search
USPC ............ 726/15, 17; 705/51; 725/39; 380/270
See application file for complete search history.

(56) References Cited

U.S. PATENT DOCUMENTS

| | | |
|---|---|---|
| 9,795,799 | 9/2004 | Deb et al. |
| 7,823,196 B1 * | 10/2010 | Caldwell et al. ................ 726/15 |
| 2003/0087601 A1 | 5/2003 | Agam et al. |
| 2003/0097054 A1 | 5/2003 | Sasaki et al. |
| 2003/0233573 A1 | 12/2003 | Phinney |
| 2010/0161209 A1 * | 6/2010 | Vaghefinazari ............... 701/201 |
| 2010/0174812 A1 | 7/2010 | Thomas et al. |
| 2010/0235042 A1 * | 9/2010 | Ying ............................... 701/33 |
| 2010/0256864 A1 * | 10/2010 | Ying ............................... 701/33 |
| 2011/0092227 A1 * | 4/2011 | Phukan ....................... 455/456.3 |
| 2011/0302607 A1 * | 12/2011 | Warrick et al. .................. 725/39 |
| 2012/0086549 A1 * | 4/2012 | Barnes, Jr. .................... 340/5.61 |
| 2013/0024381 A1 * | 1/2013 | Dala et al. ....................... 705/51 |
| 2013/0160096 A1 | 6/2013 | Nuthi |
| 2014/0121890 A1 * | 5/2014 | Gercekci ....................... 701/33.2 |
| 2014/0127992 A1 * | 5/2014 | Kuscher et al. .............. 455/41.1 |

FOREIGN PATENT DOCUMENTS

| | | |
|---|---|---|
| EP | 1026641 | 8/2000 |
| EP | 1589695 | 10/2005 |

* cited by examiner

*Primary Examiner* — Joseph P Hirl
*Assistant Examiner* — Sayed Beheshti Shirazi

(57) ABSTRACT

A system and method to troubleshoot a defect in at least one machine is provided. The system includes a portable device having a tracking system to detect when within a threshold proximity of a machine, and a controller to perform the steps of: authenticating the user to operate the portable device and communicating a first signal including the unique identifier of the portable device in response to detecting when within threshold proximity of the at least one machine. The system can further include an agent located at the machine to receive the first signal from the portable device, and in response to automatically verify authorization of the portable device to access the machine; and automatically trigger transmission of an operational data of the least one machine to the portable device over a secure channel.

16 Claims, 3 Drawing Sheets

SYSTEM AND METHOD TO TROUBLESHOOT A DEFECT IN OPERATION OF A MACHINE

TECHNICAL FIELD

The subject herein generally relates to a system and method to troubleshoot a defect in at least one machine, and more particularly to employ wireless technology in support of such endeavors in a secure manner.

BACKGROUND

Current technology exists to perform computer executed diagnostics on machines. One example is the diagnostic system that automotive repair centers use to diagnose problems with operation of a car. Problems with such known diagnostic systems is a requirement of the diagnostic system to be manually plugged in, lack of connectivity of the device or diagnostic system via networks (e.g., Internet) to a remote server, and lack of security around authorization of such diagnostic systems to access or communicate with the applicable machine. A problem with the need to plug or manual connect to the applicable machine includes cost of time and difficulty to have the corrective connection adaptors for the variety of machines to be serviced. There is a specific need for this above-described security in servicing and maintenance of machines where there are concerns for protecting personal healthcare or financial data.

The above-mentioned problems can be addressed by the subject matter described herein in the following description.

BRIEF SUMMARY

The system and method of the subject matter described herein can be directed to provide wireless, secure and automatic troubleshooting of a defect in operation of machine that reduces time and difficulty in monitoring and maintaining operation of a series at disparate locations.

According to one embodiment, a diagnostic system for operation by a user to troubleshoot a defect in at least one machine is provided. The system can comprise a portable device having: a tracking system configured to detect when within a threshold proximity of the at least one machine, and a controller having a device memory with program instructions for execution by a device processor to perform the steps of: authenticating the user to operate the portable device and communicating a first signal including the unique identifier of the portable device in response to detecting when within threshold proximity of the at least one machine. The system can further include an agent located at the at least one machine configured to receive the first signal from the portable device, the agent including program instructions stored in the agent memory for execution by an agent processor in a manner capable of: automatically verifying authorization of the portable device to access the machine based on application of the unique identifier to a license configured as program instructions stored in the agent memory; automatically triggering transmission of a second signal from the agent at the machine in response to verifying authorization of the portable device, the second signal including program instructions to establish a secure communication channel with the portable device; and communicating an operational data of the least one machine to the portable device in response to detecting the secure communication with the portable device.

According to another embodiment, a method to troubleshoot a defect in at least one machine is provided. The method can include the steps of detecting when a portable device is within a threshold proximity of the at least one machine; authenticating a user to operate the portable device; communicating a first signal including a unique identifier of the portable device in response to detecting when within the threshold proximity of the at least one machine; receiving the first signal from the portable device; automatically verifying an authorization of the portable device to access the machine based on application of the unique identifier to a license configured as program instructions stored in an agent at the machine; automatically triggering transmission of a second signal from the agent at the machine in response to verifying authorization of the portable device, the second signal including program instructions to establish a secure communication channel with the portable device; and communicating an operational data of the least one machine to the portable device in response to detecting the secure communication with the portable device.

Various other features, objects, and advantages of the invention will be made apparent to those skilled in the art from the accompanying drawings and detailed description thereof.

DETAILED DESCRIPTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
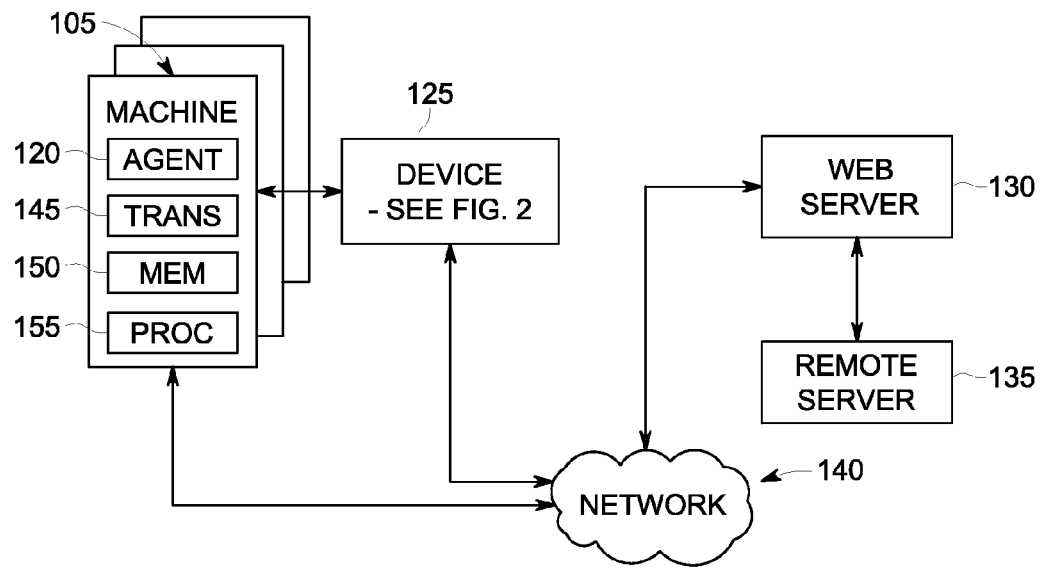
FIG. 1 is a schematic diagram of an embodiment of a diagnostic system in accordance with the subject matter described herein.

FIG. 1 illustrates a schematic diagram of an embodiment of a diagnostic system 100 configured to perform diagnostics on at least one machine 105 of a customer. The system 100 can generally include an agent 120 and a portable device 125. The diagnostic system 100 can further include a web server 130 and a remote server 135 connected in communication via a network 140 with the machine 105, as well as can be in communication via the network 140 with the portable device 125.

An embodiment of the agent 120 can generally include an agent transceiver 145 and an agent memory 150 having program instructions for execution by a processor 155 independent of or integrated with the machine 105. The agent memory 150 can generally and agent processor 155 in combination with the agent transceiver 145 to at least intermittently communicate or broadcast an agent broadcast signal.

The agent broadcast signal may but not necessarily include a data packet having a unique identifier of the machine 105. The agent transceiver 145 can employ wireless technology (e.g., image recognition, audio recognition, zigbee, infrared, radio frequency, Wi-Fi, Bluetooth, infrared, etc. as known) to communicate the above described agent broadcast signal, and is not limiting on the subject matter described herein.

A particular embodiment of the agent 120 can be located at the at least one machine 105 and configured to receive a device signal or first signal from the portable device 125, and in response be capable of automatically verifying authorization of the portable device to access the machine based on application of the unique identifier of the portable 125 and/or the unique identifier of the user of the portable device 125 to a license configured as program instructions stored in the agent memory 150; automatically trigger transmission of a handshake or second signal from the agent 120 at the machine 105 in response to verifying authorization of the portable device 125, the second signal including program instructions to establish a secure communication channel with the portable device 125, and communicating an operational data of the least one machine 105 to the portable device 125 in response to detecting the secure communication with the portable device 125.

Figure 2:
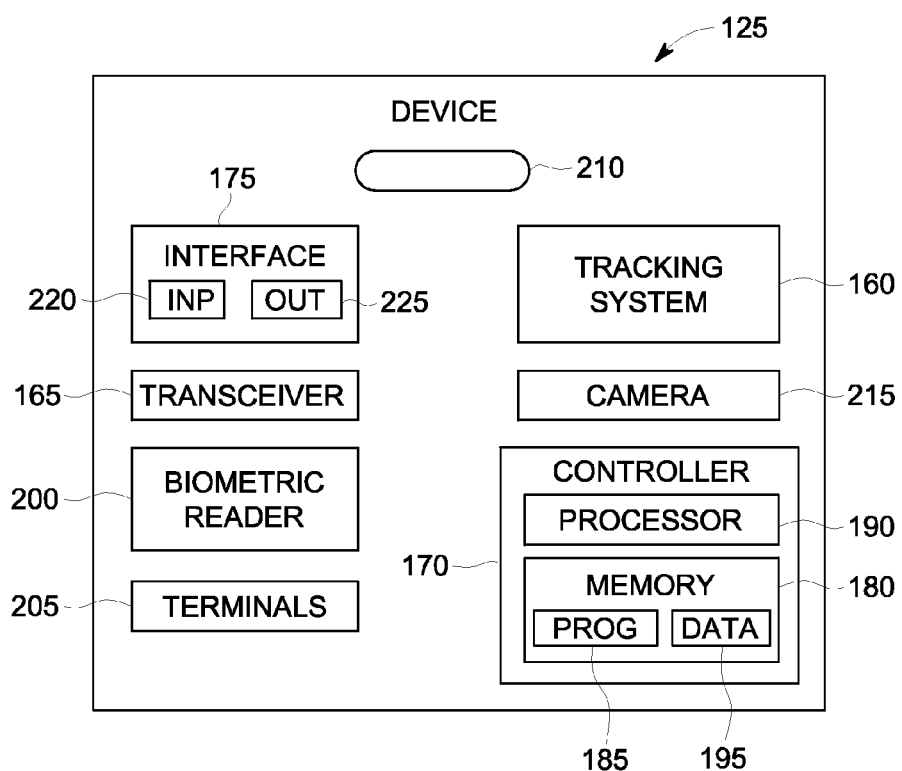
FIG. 2 is a schematic diagram of an embodiment of the portable device of the diagnostic system of FIG. 1, in accordance with the subject matter described herein.

The portable device 125 can be generally configured in communication with the agent 120 of the machine 105, as well as the web server 130 via the network 140. Referring now to FIG. 2, an embodiment of the portable device 125 can generally include a tracking system 160, a device transceiver 165, a controller 170, and an interface 175. The tracking system 160 can generally include wired or wireless technology as described above operable to detect the presence or when within a threshold proximity of the agent on the machine. For example, the tracking system 160 can detect the agent signal communicated via the agent 120 from the machine 105. The tracking system 160 may also include a bar code scanner or serial tag reader or the like operable to detect a respective bar code or tag associated with the agent 120 at the machine 105. The tracking system 160 may also include a satellite positioning system (GPS) operable to detect when the detector is within a threshold proximity of the agent 120 at the machine 105. The device transceiver 165 can be generally operable to communicate a device signal including data indicative of a unique identifier of the portable device 125 and a unique identifier of the user operating the portable device 125. The unique identifier of the user associated with the portable device 125 can be in the form of a token or key identifier indicative of authorization of the user to use the portable device 125 to communicate with and perform diagnostics on the machine 105.

An embodiment of the controller 170 can generally include a device memory 180 having a program memory 185 including program instructions for execution by the device processor 190. The controller 170 can further include a data memory 195 to receive and store operational data or analytic rules in the form of program instructions for later retrieval by the controller 170. One embodiment of the controller 170 is configured or capable to perform authenticating the user to operate the portable device 125 and communicating a first signal including the unique identifier of the portable device 125 in response to detecting when within the threshold proximity of the at least one machine 105.

The portable device 125 can further include a biometric reader 200 having fingerprint, facial recognition, etc. recognition technology operable to detect an identification of the user for use to authenticate permission of the user to perform diagnostics via the portable device 125. The portable device 125 can further include terminals 205 to receive or transmit communications via wired connections. The portable device 125 can further include a microphone 210 operable to receive voice commands via voice recognition technology known in the art to interact (e.g., provide input, etc.) with the portable device 125, as well as a camera 215 to capture photographs or video for use by the portable device 125 or transmission to the remote server 135.

The interface 175 can generally include an input 220 in combination with an output 225 for interaction with the user. The input 220 can include a touchscreen, keypad, keyboard, voice recognition, etc. known in the art to receive instructions from the user of the portable device 125. The output 225 can include a graphic user interface (GUI), speaker, light-emitting diodes (LEDs), etc. known in the art to provide visualization and audible illustrations to the user of the portable device 125.

An embodiment of the web server 130 can generally be private and operable to support secure communications between the portable device 125 or machine 105 and the remote server 135. The web server 130 can be operable as a "cloud server" as known in the art, as running on an operating system (e.g., Linux, Windows, etc.) that is instantiated via a web interface to access or retrieve analytic rules (e.g., service diagnostic or troubleshooting software programs or engines) or information in a known manner. An embodiment of the remote server 135 can generally located in a back office or remote location, such as of a service provider under license or contract to service or perform maintenance on the machine 105.

Referring now in general to FIGS. 1 and 2, an embodiment of the portable device 125 can be configured to detect receipt of the second signal that includes the operation data from the agent, and identify one of a series of analytic rules as stored as at least one programming instruction in the device program memory 185 of the controller 170 upon associating with the operational data, execute the at least one analytic rule in a manner configured to identify the defect in operation of the at least one machine 105, and generate a graphic illustration indicative of the defect at the display of the output 225 for visualization by the user of the portable device 125.

Having provided an embodiment of one construction of the system 100 in accordance with above-description, the following is a description of an embodiment of a method 300 to operate the system 100 to perform diagnostics on at least one machine 105 of a customer, in accordance with the subject matter described herein. It should also be understood that the sequence of the acts or steps of the method 300 as discussed in the foregoing description can vary. Also, it should be understood that the method 300 may not require each act or step in the foregoing description, or may include additional acts or steps not disclosed herein. It should also be understood that the below description of the one or more of the steps of the method 300 are representative of one or more modules of computer-readable program instructions, as stored in the program memory 185 of the portable device 125 or servers 130, 135, capable or configured to execute the described steps by one or more processors 190 of the portable device 125 or diagnostic system 100 in accordance to that provided herein, and are not described or shown independently as computer program instruction modules for sake of brevity.

Figure 3:
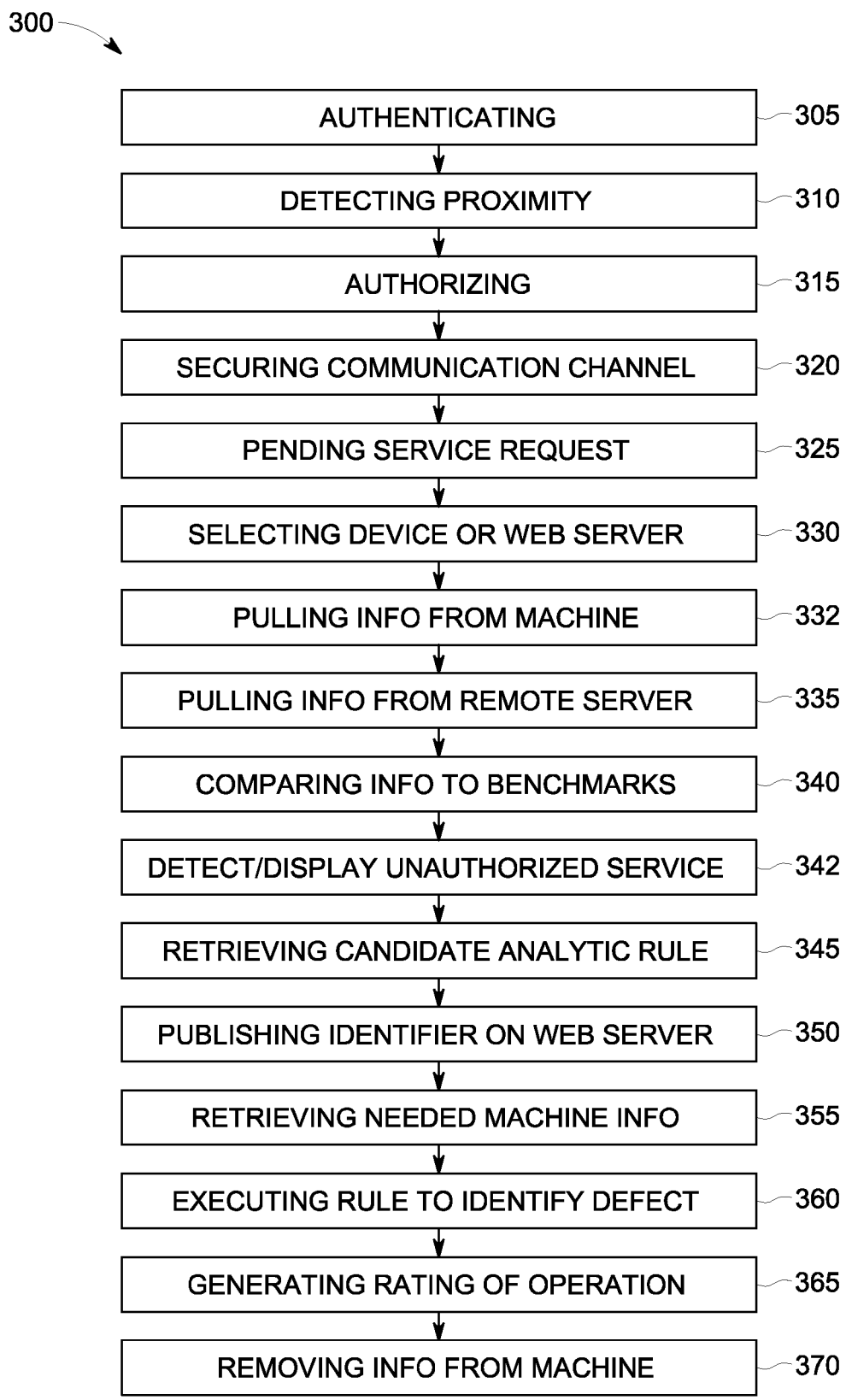
FIG. 3 shows a flow diagram of an embodiment of a method of operating the system of FIG. 1 in accordance with subject matter described herein.

Referring now to FIG. 3 and according to one embodiment, step 305 includes authenticating a unique user to use or operate the portable device 125. Step 305 can include the portable device 125 receiving an authentication token or key (hereinafter "authentication token") representative of at least one of an authorization of the user to use or operate the portable device 125. An example of such a token technology is the "VPN Client" as offered by CISCO™. The portable device 125 may be pre-loaded with program instructions or data representative of the authentication token associated with the unique user of the portable device 125 for storage in the program memory 185 or data memory 195 of the device memory 180, or the portable device 125 can communicate an authentication signal to the remote server 135 representative of the unique identifier of the user in accordance to that detected by the biometric reader 200 or input (e.g., pin number) received via the interface 175 of the portable device 125. In response to receiving the authentication signal, the remote server 135 can communicate the authentication token to the portable device 125. Step 305 can further include limiting access of the user of the portable device 125 to less than all of the analytic rules or other program instructions stored on the portable device 125 and accessible via the web server 130, dependent on the unique identifier of the user.

Step 310 can include detecting a presence of the at least one of a plurality of machines 105 of customer via the tracking system 160 within a threshold proximity of the portable device 125. Step 310 can include receiving and detecting a signal including an information packet of data indicative of a license registration or subscription (e.g., service agreement) of the least one machine 105 as available to be accessed by the portable device 125.

In response to detecting the presence of the least one machine 105 in accordance to step 310, step 315 can include requesting authorization for a level of access to the data or files residing on the at least one machine 105. Step 315 can include communicating (e.g., via the device transceiver 165 of the portable device 125 to the agent transceiver 145 at the machine 105) a signal including a unique identifier of the portable device 125 in combination with a unique identifier of the user of the portable device 125. In response to detecting the signal, the agent 120 at the at least one machine 105 can perform a comparison of the unique identifier of the portable device 125 and user to a stored authorization files pre-loaded and stored at the agent 120. In another embodiment, the agent 120 can trigger communication of the unique identifier of the device 125 and user to the remote server 135, and in response the remote server 135 can push a signal including program instructions or data that verifies authorization of the unique identifier of the portable device 125 in combination with the unique identifier of the user to access one of a plurality of levels of access to the at least one of the plurality of customer machines 105. For example, a full authorization level may allow the portable device 125 to have access to perform all stored diagnostics or service, allow access to multiple types of machines 105, and allow access to machines 105 of multiple customers. In contrast, a sublevel of a full authorization may only allow use or operation of the portable device 125 with a limited access to machine data or files or to perform diagnostics or service of the machine 105, a subset of types of machines 105, and only machines 105 of a unique subset of multiple customers.

Upon identifying authorization of the portable device 125 and associated user to access the machine 105 as described above, step 320 can include the portable device 125 and the agent 120 of the machine 105 sharing information (e.g., a handshake) to establish a secure communication channel therebetween.

Step 325 can include the portable device 125 or the agent 120 detecting if there is an open or pending service request at one of the agent 120, the web server 130, the remote server 135, and the portable device 125. The portable device 125 can be pre-loaded with the service request associated with the unique identifier of the machine 105 before the proximity step was performed. If a pending (not completed or not closed) service request is detected, the portable device 125 can include program instructions to automatically pull information associated with the service request via the network from the remote server 135, or simply retrieve stored information associated with the service request from the device memory 180. As defined herein, "pull" includes being configured to or capable (e.g., as executing program instructions) to prompt to send or communicate information or data.

If an open service request is not detected, step 330 can include allowing communication of the agent 120 of the machine 105 solely with one of the web server 130 and the portable device 125 in response to an instruction received in response to a user prompt via the portable device 125. The user prompt can be generally configured to receive the instruction selecting to either communicate going forward either solely via the portable device 125 or the web server 130 via the network 140 with the agent 120 of the machine 105. Step 330 can be performed automatically via a decision tree or algorithm based on the following parameters: detection or lack of detection of network 140 to communicate with the web server 130, the type of machine 105 (e.g., computed tomography (CT) imaging system, magnetic resonance (MR) imaging system, ultrasound (U/S) imaging system, etc.). Step 330 can also be performed in response to input received in response to a prompt to the user via the portable device 125.

Step 332 can include automatically pulling data from the machine 105, including but not limited to operational data, error logs, log files, etc. Step 335 can include executing program instructions to pull service history information from the via the web server 130 from the remote server 135, including but not limited to error logs, log files, service request history, etc. or combination thereof, associated with the unique identifier of the machine 105.

Step 340 can include performing a comparison of acquired operational data, error logs, log files, service request history, etc. or combination thereof to stored benchmark or threshold parameters at the portable device 125 or via the network 140 to the web server 130. The benchmark or threshold parameters can be uniquely associated with each of a plurality of analytic rules (e.g., diagnostic or troubleshooting software programs or engines) stored as computer program instructions on the portable device 125 or at the web or remote servers 130, 135.

Step 342 can include comparison of acquired data described above in step 340 to unique identifiers of replacement parts installed on the machine 105, log files of procedural steps to service the machine 105, and log files of events of authorization and identification to access to perform on the machine 105 for comparison to benchmarks of unique identifiers of authorized replacement parts, benchmark protocols to service the machine 105, and benchmarks or stored data of authorized service personnel to access the machine 105. An embodiment of step 342 can include identification or detection of unique packets of information with unique identifiers of parts, protocol steps, etc. (e.g., automatically transmitted with establishing of the secure channel of communication between the machine 105 and the portable device 125) missing from a benchmark list of authorized parts, protocol steps, etc. stored at the portable device 125. Step 342 can further include detecting and displaying at the output 225 of the portable device 125 events or occurrences of unauthorized parts, unauthorized intrusions to access the machine 105, unauthorized procedures performed on the machine 105, and unauthorized personnel accessing the machine 105 for illustration to the user. This step 342 may further include communication of the above-described occurrences of unauthorized events to the web server 130 and storage on the remote server 135.

Based on the comparison performed in step 340, step 345 can include automatically identifying and retrieving one or more candidate analytic rules from a plurality of analytic rules stored as program instructions for execution to identify a defect in the operation of the machine 105. The portable device 125, the web server 130, or the remote server 135 can be operable or configured to perform this comparison step in identifying the one or more candidate analytic rules from the plurality of stored analytic rules.

If the candidate analytic rules require significant memory space to be stored at the portable device 125, an embodiment of step 345 can include either the web or remote servers 130, 135 to be configured to automatically retrieve and execute the candidate analytic rules. Otherwise, the web or remote servers 130, 135 can be configured to automatically push the identified candidate analytic rules to the portable device 125 for execution with or without the machine 105. In this embodiment of step 345, the portable device 125 can automatically create a service request that includes operational data, error logs, log files, service request history, etc. or combination thereof and communicating via the network 140 to the remote server 135. In response, the remote server 135 can push one or more candidate analytic rules in the form of program instructions for execution at the portable device 125 or machine 105, or the remote server 135 can execute the candidate analytic rules.

If the acquired or retrieved operational data, error logs, log files, and service history associated with the unique identifier of the machine is insufficient to identify a candidate analytic rule under step 345, step 350 can include pushing the unique identifier of the machine 105 (e.g., serial number, time, etc.) for publication on the web server 130. In response to publication in step 350, step 355 can include an analytic rule (e.g., diagnostic or troubleshooting software programs, engines, etc.) residing on the web server or remote servers 130, 135 automatically retrieving needed machine data or information (e.g., operational, error logs, log files, service history, etc.). An embodiment of step 355 can include providing or communicating a test signal via the network 140 to the machine 105 capable or configured to trigger generation of specific machine operation data or miscellaneous information by the machine 105, and then pulling this operational data or miscellaneous information from the machine 105, executing diagnostic or troubleshooting software programs or engines capable or configured to detect a defect in the operation of the machine 105.

Step 360 can include running or executing the candidate analytic rules described above to identify or detect a defect in operation of the machine 105. The candidate analytic rules can be executed based on the input of one or more of the operation data, error logs, log files, service history, etc. acquired from the machine 105 or acquired from the remote server 135. As described above, the candidate analytic rules can be executed as program instructions by one or more of the remote server 135, the portable device 125, and the machine 105. Step 360 can include the portable device 125 automatically generating a service request for communication to the web server 130 configured or capable to correct the identified or detected defect of the machine 105 as described in step 360. The service request may include an order to schedule shipment of a unique identifier of a replacement part to correct the defect in operation of the machine 105, or an order to schedule field service personnel to perform a site visit or travel to the location of the machine 105 either to service or perform maintenance or to install the applicable replacement part. Step 360 can include automatically creating the order to schedule travel of a service personnel based on the location of the machine 105 as automatically identified with the portable device in step 310.

Step 360 can further include identifying or detecting a defect in operation of the machine 105 or rating of the operation or state of one of a series of machine 105 in secure connection with per above based on general real-time information (e.g., operation data, location data, etc.) of the environment or from general real-time information of identified or detected defects in the operation of other machines at the same site address or threshold location. For example, the system 100 can identify that the operation of the machine 105 as not operative and identify that the defect in the operation of the machine 105 based on information of a power outage or network shutdown based on general operational data received from another machine 105 at the same site address or general location or as communicated to the system 100.

Step 365 can include automatically creating an illustration of a rating of an operation of the machine 105, including but not limited to if working or operative properly versus not operative or working properly, if needs service, if needs part replacement, if needs minor versus major service, etc.

Step 370 can include automatically removing or deleting at least a portion or all of any information or files associated with establishing the secure communication channel of the agent 120 with the portable device 125. One embodiment of the step 370 can be performed automatically by the agent 120, removing any data from the agent 120 associated with communication with the portable device 125 upon detection of the portable device 125 no longer within the threshold proximity or threshold distance of the machine 105. The removed or deleted data can include authorization of the portable device 125 to access data or otherwise communicate with the machine 105, authorization of the user of the portable device 125 to access communication with the machine 105, and any analytic rules or program instructions downloaded to the agent 120 or the machine 105 via the portable device 125 or the remote server 135 in response to the above described authorization. Likewise, step 370 can include removing any data (e.g. authorization data) associated with the communication with the agent 120 of the machine 105 or associated with the unique identifier of the machine 105 from the portable device 125, in a like manner to detecting the portable device 125 to be beyond the threshold proximity of the agent 120 or machine 105. This step 370 can provide an additional layer of security associated with servicing of the machine 105.

Figure 4:
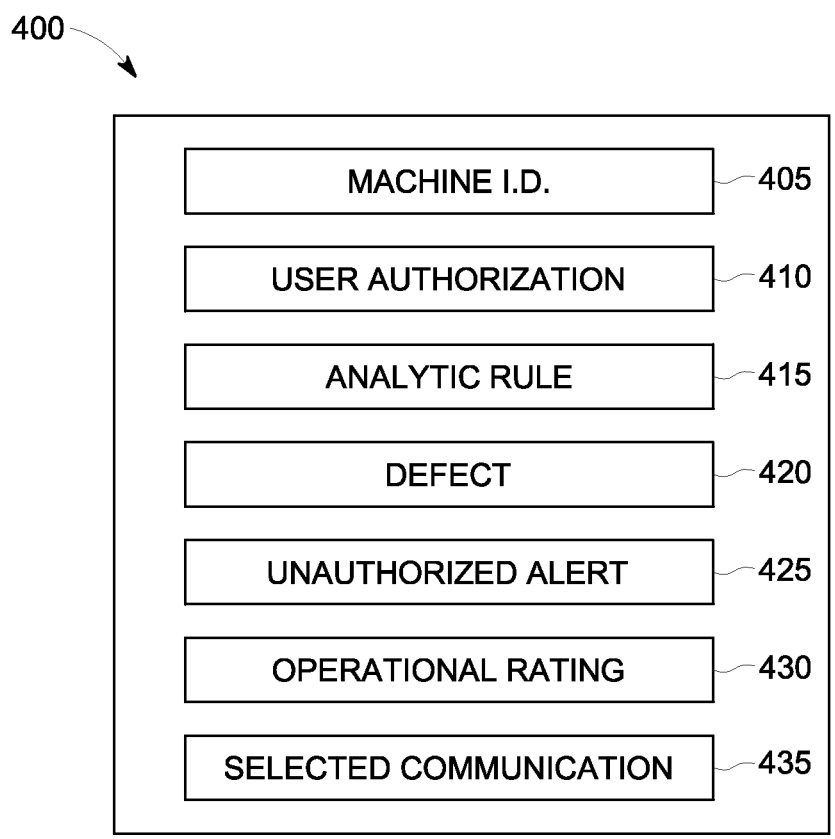
FIG. 4 shows an embodiment of a display of the output of the portable device of FIG. 2 in accordance with the subject matter described herein.

FIG. 4 shows an embodiment of a display 400 at the output 225 of the portable device 125 in accordance with the description above. The display 400 can include various graphic illustrations, including but not limited to, graphic illustration 405 of a unique identifier of the machine 105; graphic illustration 410 of an authorization level of the user of the portable device 125; graphic illustration 415 of an identified analytic rule executed on data associated with the machine 105; graphic illustration 420 of an indication of the defect identified in the operation of the machine 105; graphic illustration 425 of an alert of unauthorized part, protocol, or access detected in association with the machine 105; graphic illustration 430 of a rating of the operation of the machine 105; and graphic illustration 435 of a selection prompt and/or indication of selection of the agent 120 to communicate solely via the web server 130 of the diagnostic system 100 versus the portable device 125. Of course, the description of the illustrations in the display 400 is not limiting on the subject matter described herein.

A technical effect of the above-described diagnostic system 100 and method 300 can include a modular or portable capability that supports proximity-based service computer program applications or rules configured or capable to perform the requisite analytics and provides diagnostic or troubleshooting results automatically when within a threshold proximity of a machine 105 under a service agreement. The system 100 can also be configured to and capable of associating or executing analytic rules and execute diagnostic or troubleshooting analytic rules based on a general real-time machine operation data. The system 100 and method 300 can also provide a capability for automatic generation of asset health check reports, reports of unauthorized intrusions or use of unauthorized parts/software or unauthorized access or unauthorized protocol on the machine 105. The system 100 and method 300 can also execute program instructions to leave a zero footprint on the machine 105 by deleting all the data or files that were generated to enable communication or access to the machine 105.

The system 100 and method 300 also provides the capability to run analytics rules in the form of program instructions on the portable device 125 in a manner capable acquire real time operational data from the machine 105 along with a context as well as download historical data in scenarios or environments, including areas that lack proper network infrastructure in rural areas, emerging and developing markets etc. Thereby, the system 100 and method 300 can automatically perform dynamic analysis in general real-time when within the portable device 125 is within the threshold proximity of but yet not physically connected to the machine 105, in a manner configured to identify and illustrate the defect in operation of the machine 105. The system 100 and method 300 can also obviate a need to put advanced analytics algorithms and processing logic on each machine 105 of customer, address difficulties in upgrading analytic rules on remote located machines 105, provide ability to automatically perform analytics and troubleshooting for defects in operation of machines 105 when only within a threshold proximity of the portable device 125 such that no physical connection is needed, and provide capability to automatically authenticate credentials of users accessing or conducting the troubleshooting the machine 105, thereby reducing service costs and improving uptime and timely correction of problems or defects in operation of the machine 105.

This written description uses examples to disclose the subject matter, and to enable one skilled in the art to make and use the invention. The patentable scope of the subject matter is defined by the following claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A diagnostic system for operation by a user to troubleshoot a defect in at least one medical system, the system comprising:
   a portable device having: a tracking system configured to detect when within a threshold proximity of the at least one medical system and a controller having a device memory with program instructions for execution by a device processor to perform the steps of: authenticating the user to operate the portable device and communicating a first signal including the unique identifier of the portable device in response to detecting when within threshold proximity of the at least one medical system;
   an agent located at the at least one medical system configured to receive the first signal from the portable device, the agent including program instructions stored in the agent memory for execution by an agent processor in a manner capable of:
      automatically verifying authorization of the portable device to access the one medical system based on application of the unique identifier to a license configured as program instructions stored in the agent memory;
      automatically triggering transmission of a second signal from the agent at the one medical system in response to verifying authorization of the portable device, the second signal including program instructions to establish a secure communication channel with the portable device; and
      communicating an operational data of the least one medical system to the portable device in response to detecting the secure communication with the portable device; and
   a cloud server in communication via a network with the portable device;
   a display at the portable device; where the portable device further includes program instructions for execution by the processor in a manner capable of:
      automatically communicating a third signal from the portable device via the network to the cloud server, the third signal including a request to identify at least one of a service diagnostic and a troubleshooting software programs associated with the operational data of the at least one medical system,
      detecting receipt of a fourth signal including the at one of a service diagnostic and a troubleshooting software program for storage at the portable device from the cloud server,
      automatically executing the at one of a service diagnostic and a troubleshooting software program by the controller of the portable device to identify the defect in operation of the at least one medical system, and
      creating a graphic illustration indicative of the defect at the display of the portable device for visualization by the user,
   wherein the controller of the portable device further includes program instructions for execution by the device processor to perform the steps of: limiting communication of the agent of the at least one medical system to solely one of the cloud server and the portable device in response to an instruction received via the portable device from the user.

2. The diagnostic system of claim 1, where the portable device includes program instructions for execution by the device processor in a manner capable of:
   detecting receipt of the second signal,
   identifying one of a plurality of service diagnostic and a troubleshooting software as stored as at least one programming instruction in the memory of the controller upon associating with the operational data in the second signal, and executing the one of the plurality of service diagnostic and a troubleshooting software in a manner configured to identify the defect in operation of the at least one medical system, and
   generating a graphic illustration indicative of the defect at the display for visualization by the user of the portable device.

3. The diagnostic system of claim 1, the portable device further including program instructions stored in the device memory for execution by the device processor in a manner capable of:
  automatically detecting at least one of an unauthorized replacement part on the at least one medical system, an authorized protocol performed on the at least one medical system, and an unauthorized access to the at least one medical system.

4. The diagnostic system of claim 1, the agent further including program instructions stored in the agent memory for execution by the agent processor in a manner capable of:
  removing any data from the agent associated with communication with the portable device upon the tracking system detecting the portable device beyond the threshold proximity of the at least one medical system.

5. The diagnostic system of claim 1, the portable device further including program instructions stored in the device memory for execution by the device processor in a manner capable of:
  removing any data from the portable device associated with communication with the medical system upon detecting an interruption of the secure communication channel with the agent.

6. The system of claim 1, the portable device further including program instructions stored in the device memory for execution by the device processor in a manner capable of:
  limiting access of the user of the portable device to less than all of the at one of a service diagnostic and a troubleshooting software program stored on the portable device dependent on a unique identifier of the user.

7. The system of claim 1, wherein the portable device is capable to automatically perform dynamic analysis in general real-time when within the threshold proximity of but yet not physically connected to the at least one medical system, in a manner configured to identify and illustrate the defect in operation of the at least one medical system.

8. The system of claim 7, wherein the portable device is capable of automatically detecting and generating an illustration of a rating of the operation of the at least one medical system.

9. A method to troubleshoot a defect in at least one medical system, the method comprising the steps of:
  automatically detecting when a portable device is within a threshold proximity of the at least one medical system;
  authenticating a user to operate the portable device;
  communicating a first signal including a unique identifier of the portable device in response to detecting when within the threshold proximity of the at least one medical system;
  receiving the first signal from the portable device;
  automatically verifying an authorization of the portable device to access the at least one medical system based on application of the unique identifier to a license configured as program instructions stored in an agent at the at least one medical system;
  automatically triggering transmission of a second signal from the agent at the at least one medical system in response to verifying authorization of the portable device, the second signal including program instructions to establish a secure communication channel with the portable device;
  communicating an operational data of the least one medical system to the portable device in response to detecting the secure communication with the portable device;
  automatically communicating a third signal from the portable device via a network to a cloud server, the third signal including a request to identify a service diagnostic and a troubleshooting software associated with the operational data of the at least one medical system,
  detecting receipt of a fourth signal including the service diagnostic and a troubleshooting software for storage at the portable device from the cloud server;
  automatically executing the service diagnostic and a troubleshooting software by the controller of the portable device to identify the defect in operation of the at least one medical system;
  creating a graphic illustration indicative of the defect at the display of the portable device for visualization by the user; and
  limiting communication of the agent of the at least one medical system with solely one of the cloud server and the portable device automatically in response to an instruction received via the portable device from the user.

10. The method of claim 9, further including the steps of:
  detecting receipt of the second signal;
  identifying one of a plurality of service diagnostic and a troubleshooting software as stored as at least one programming instruction in the memory of the controller upon associating with the operational data in the second signal, and executing the at least service diagnostic and a troubleshooting software in a manner configured to identify the defect in operation of the at least one medical system; and
  generating a graphic illustration indicative of the defect at the display for visualization by the user of the portable device.

11. The method of claim 9, the method further including the steps of:
  automatically detecting at least one of an unauthorized replacement part on the at least one medical system, an authorized protocol performed on the at least one medical system, and an unauthorized access to the at least one medical system; and
  generating an illustration of the at least one of the unauthorized replacement part, the unauthorized protocol performed and the unauthorized access at the display for visualization by the user.

12. The method of claim 9, further including the step of:
  removing any data from the agent associated with communication with the portable device upon the tracking system detecting the portable device beyond the threshold proximity of the at least one medical system.

13. The method of claim 9, further including the step of:
  removing any data from the portable device associated with communication with the at least one medical system upon detecting an interruption of the secure communication channel with the agent.

14. The method of claim 9, further including the portable device further including program instructions stored in the device memory for execution by the device processor in a manner capable to:
  identify a defect in the operation of the at least one medical system connected via the secure communication channel with the portable device based on stored information at the portable device of defects in operation of other medical systems at the same address or threshold location.

15. The method of claim 9, further including the step of:
  automatically performing dynamic analysis in general real-time when within the threshold proximity of but yet not physically connected to the at least one medical system, in a manner configured to identify and illustrate the defect in operation of the at least one medical system.

16. The method of claim 15, further including the step of:
automatically detecting a rating of the operation of the at least one medical system dependent on the operational data received via the agent from the at least medical system; and generating an illustration of the rating of the operation of the at least one medical system for visualization by the user of the portable device.

\* \* \* \* \*